United States Patent
Pögel et al.

(10) Patent No.: US 8,622,077 B2
(45) Date of Patent: Jan. 7, 2014

(54) POSITION SENSOR UNIT AND VALVE ARRANGEMENT

(75) Inventors: Oliver Pögel, Lohr am Main (DE);
Dieter Morawski, Marktheidenfeld (DE); Jürgen Heinzmann, Babenhausen (DE); Hans-Kersten Lesk, Immenstadt (DE)

(73) Assignees: Robert Bosch GmbH, Stuttgart (DE); Magnet-Schultz GmbH & Co. KG, Memmingen (DE)

( * ) Notice: Subject to any disclaimer, the term of this patent is extended or adjusted under 35 U.S.C. 154(b) by 533 days.

(21) Appl. No.: 12/872,317

(22) Filed: Aug. 31, 2010

(65) Prior Publication Data

US 2011/0062356 A1 Mar. 17, 2011

(30) Foreign Application Priority Data

Sep. 14, 2009 (DE) ............. 10 2009 041 159

(51) Int. Cl.
*F16K 31/06* (2006.01)

(52) U.S. Cl.
USPC ............ 137/315.03; 251/129.04; 324/207.15

(58) Field of Classification Search
USPC ......... 137/315.03, 554; 251/129.04, 129.15, 251/129.1, 129.18; 324/207.13, 207.15
See application file for complete search history.

(56) References Cited

U.S. PATENT DOCUMENTS 4,984,549 A * 1/1991 Mesenich .................. 123/472
5,494,255 A * 2/1996 Pearson et al. ........... 251/129.15
7,093,613 B2 * 8/2006 Hofling et al. ............. 137/554
2003/0052289 A1 * 3/2003 Jansen ...................... 251/63.5
2008/0257422 A1 * 10/2008 Fack et al. ................ 137/487.5

FOREIGN PATENT DOCUMENTS

DE 35 06 053 A1 8/1986
DE 196 43 976 A1 5/1998

OTHER PUBLICATIONS

Rainer et al., DE3506053, Published Aug. 21, 1986, Description Translated by EPO and Google on Dec. 27, 2012, http://translationportal.epo.org/emtp/translate/?ACTION=description-retrieval&COUNTRY=DE&ENGINE=google&FORMAT=docdb&KIND=A1&LOCALE=en_EP&NUMBER=3506053&OPS=ops.epo.org&SRCLANG=de&TRGLANG=en.*
Martin, DE19643976A1, Published May 7, 1998, Description Translated by EPO and Google on Dec. 27, 2012, http://translationportal.epo.org/emtp/translate/?ACTION=description-retrieval&COUNTRY=DE&ENGINE=google&FORMAT=docdb&KIND=A1&LOCALE=en_EP&NUMBER=19643976&OPS=ops.epo.org&SRCLANG=de&TRGLANG=en.*

* cited by examiner

*Primary Examiner* — John K Fristoe, Jr.
*Assistant Examiner* — Matthew W Jellett
(74) *Attorney, Agent, or Firm* — Oliff & Berridge, PLC

(57) ABSTRACT

Disclosed are a position sensor unit and a valve arrangement comprising such a position sensor unit, wherein a sensor housing of the position sensor unit is fixed in position with respect to a housing of an actuating magnet or a valve by an adjusting nut and a counter nut. The counter nut is mounted on the sensor housing and supported at the housing.

14 Claims, 2 Drawing Sheets

POSITION SENSOR UNIT AND VALVE ARRANGEMENT

Figure 1:
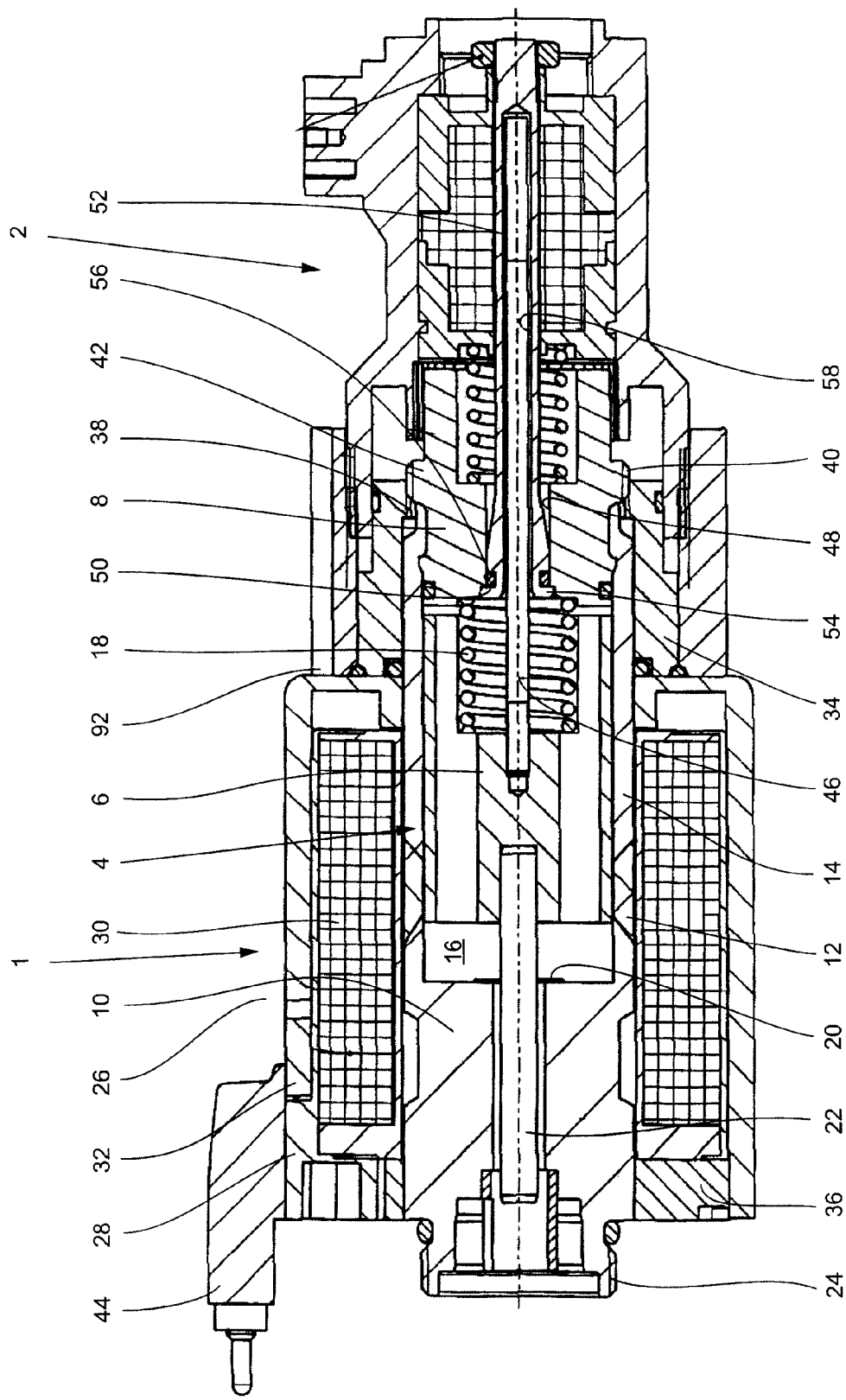

The invention relates to a position sensor unit according to the preamble of claim 1, and to a valve arrangement comprising such a position sensor unit.

Such a position sensor unit is, for instance, disclosed in DE 196 43 976 A1. This document shows a switching magnet for a hydraulic valve, wherein the switching position of the hydraulic valve actuated by the switching magnet is sensed by a position sensor that is attached laterally to a switching magnet housing. In this known solution an axially movable armature of the switching magnet is connected with a measuring bar that immerses from the switching magnet housing into a housing of the position sensor and is sealed via a pressure pipe. The axial displacement of the measuring bar causes a field change in a coil winding of the position sensor, so that this field change gives an indication of the switching position of the armature and thus of the actuating magnet. In such solutions it is essential that the position of the measuring bar is adjusted relative to the coil winding and to the armature to enable an exact measurement.

In the known solution, adjusting is performed by an adjusting nut via which the coil winding that is guided on the pressure pipe is displaced in axial direction against the force of an adjusting spring. The coil winding is then fixed in the desired relative position, on the one hand, by the adjusting spring and, on the one hand, by the adjusting nut that is, for instance, designed as a self-locking nut.

The fastening of the position sensor at the switching magnet housing is, in this solution, performed by a slide-on casing encompassing the housing of the position sensor unit, by which a flanged end portion of a pole tube is connected with a fixing member of the position sensor unit in a force-fit manner.

A disadvantage of this known solution is, on the one hand, the relatively complex structure and, on the other hand, a comparatively defective adjustment since the clamping between the adjusting spring, on the one hand, and the adjusting nut, on the other hand, does not ensure an exact adjusting position—for instance, in the case of temperature changes—, so that the position sensor may tend to temperature drifting, and thus the risk of a defective position sensing exists.

DE 35 06 053 A1 discloses a position sensor unit of a switching magnet in which the position sensor unit is also attached laterally to a switching magnet housing, wherein the relative positioning of the measuring bar that is connected with the armature of the switching magnet to the coil winding of the position sensor unit is—similar to the afore-described solution—adapted to be adjusted by an adjusting nut, wherein the fixing in the adjusting position is then performed by a counter nut arranged in the transition area between the switching magnet housing. Via this counter nut, the position sensor unit is also connected with the switching magnet. Such a solution requires substantial constructive adaptations at the switching magnet housing since it is necessary to form the thread of the counter nut at the housing.

In contrast to this, it is an object of the invention to provide a position sensor unit and a valve arrangement comprising such a position sensor unit, wherein the adjustment and the fastening of the position sensor unit is possible with little effort.

This object is solved with respect to the position sensor unit by the features of claim 1 and with respect to the valve arrangement by the feature combination of claim 13.

The position sensor unit according to the invention is provided to be attached to a housing, preferably a valve or actuating magnet housing, and comprises a coil with a measuring bar that is movable relative thereto. These components are accommodated in a sensor housing that is adapted to be displaced by means of an adjusting nut in the direction of the sensor axis for adjusting the relative position. In accordance with the invention, the position fixing of the sensor housing is performed by a counter nut that is, on the one hand, supported at the housing and, on the other hand, encompasses the sensor housing in sections and is in thread engagement therewith.

This variant requires comparatively little constructional modifications of the housing, for instance, a valve housing or an actuating magnet housing, since the counter nut merely has to be supported at this housing. By the thread engagement between the counter nut and the sensor housing it is possible to adjust the latter also by twisting the counter nut in axial direction, so that the adjustment and the position fixing are possible in an extremely simple and exact manner.

In a variant according to the invention, the housing and the sensor housing are indirectly or directly connected with each other by means of an anti-twist protection, so that a relative twisting is not possible when the counter nut is adjusted.

This anti-twist protection is, for instance, formed by a notched internal toothing that is, on the one hand, formed at a locking collar of the coil housing and, on the other hand, as an external toothing at a hub projection of the housing. In particular, the housing-side toothing may be formed on a stroke limitation of the pole tube of an actuating magnet. The toothing may be designed as a notched toothing or as a knurling, respectively.

In one embodiment of the invention, the counter nut comprises an internal thread that is adapted to be brought in engagement with an external thread of a fastening flange encompassing the locking collar.

In order to further simplify the adjustment, the coil housing is adapted to be biased via the adjusting nut against a spring that is supported at the housing, so that the adjusting position is defined even if the counter nut is released.

In a particularly compact variant of the position sensor unit, the sensor-side fastening flange is guided on a coil fastening nut of the housing.

In a simple embodiment, the sensor coil and the coil housing are connected with each other by injection molding. In a further development of this embodiment, the current supply and signal connections of the coil may also be injected.

In a preferred embodiment of the invention, the housing is a magnet coil housing of an actuating magnet, preferably a switching magnet, wherein the measuring bar is actuated by an armature of the actuating magnet.

The construction of the position sensor unit is particularly simple if the above-mentioned hub projection is formed at a stroke limitation of a pole tube of the actuating magnet.

In an alternative variant, the housing may also be a valve housing to which the position sensor unit is directly attached to sense a position of a valve element.

The structure of the position sensor unit is particularly simple if the sensor housing is guided on a pressure pipe which is anchored at the side of the housing and into which the measuring bar immerses and onto which the adjusting nut is adapted to be screwed.

The actuating magnet may be designed as a switching magnet and/or as a proportional solenoid. As a matter of principle, the afore-described structure may also be used with other sensors.

The counter nut may be supported directly at the housing (valve housing/actuating magnet housing) or at the coil fastening nut via which, for instance, a magnet coil of the actuating magnet is fixed in axial direction.

Other advantageous further developments of the invention are the subject matter of further subclaims.

Figure 2:
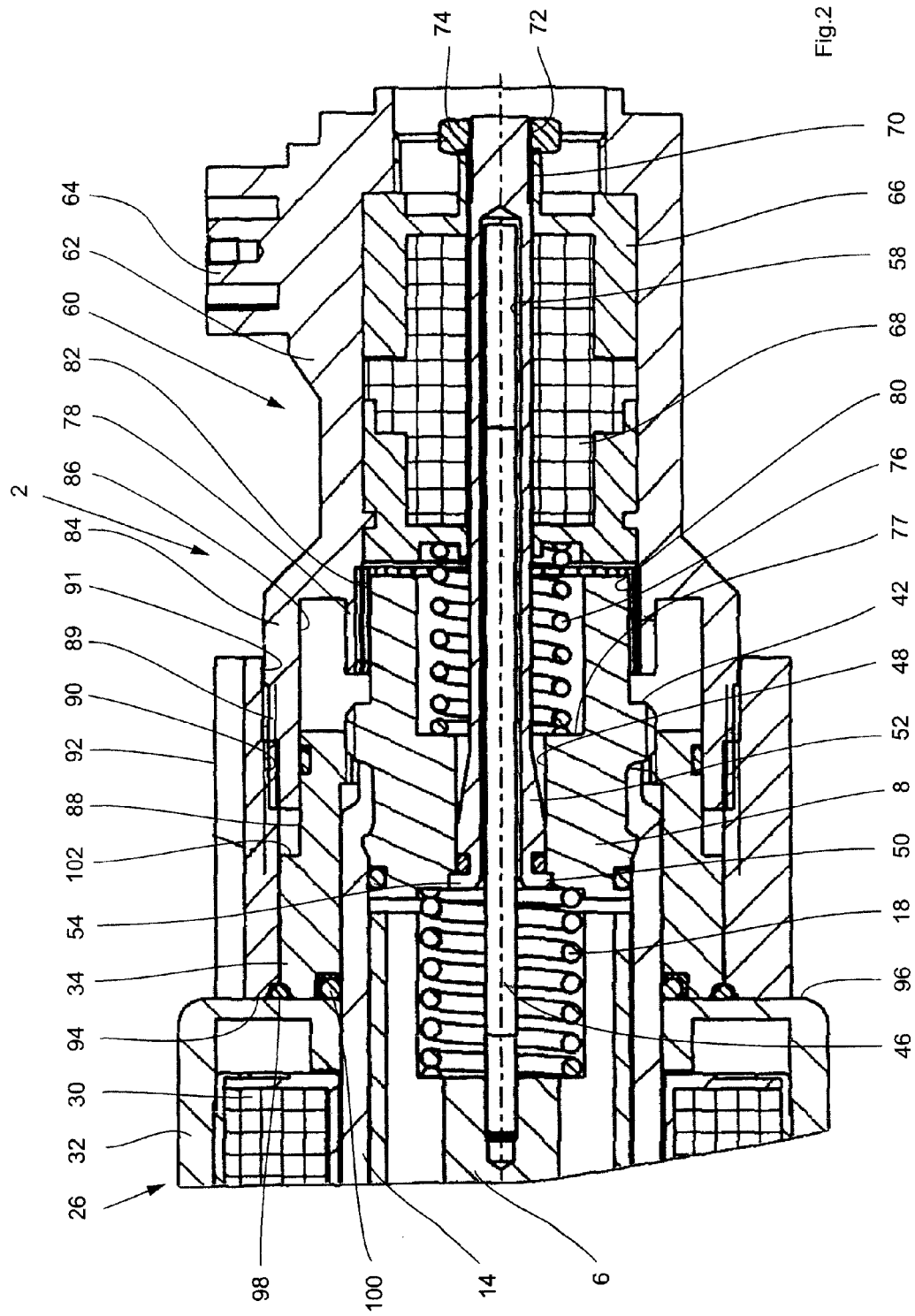

A preferred embodiment of the invention will be described in detail by means of schematic drawings. There show:

FIG. 1 a longitudinal section through an assembly with an actuating magnet and a position sensor unit attached thereto, and FIG. 2 an enlarged partial representation of the assembly of FIG. 1.

FIG. 1 shows an actuating magnet 1, for instance, a switching magnet of a valve for controlling a pressure agent flow, and a position sensor unit 2 attached thereto for detecting a position of a valve body of this valve. The basic structure of the actuating magnet 1 corresponds to that of conventional solutions, so that only the components that are essential for the understanding of the invention will be explained here. The actuating magnet 1 comprises a pole tube 4 in which an armature 6 is guided to be displaced axially. The operating displacement of the armature 6 is, on the one hand, formed by a stroke limitation 8 that is screwed into the pole tube 4 at the front side and, on the other hand, by a pole piece 10 of the pole tube 4. The front-side pole piece 10, an intermediate ring 12 of a non-magnetizable material which is attached thereto laterally, and a pole tube ring 14 that is welded therewith, as well as the stroke limitation 8 mentioned confine an armature chamber 16 for the armature 6. The armature 6 is, via a spring 18 that is supported at the stroke limitation 8, biased in the direction of a basic position that is not illustrated, in which the armature 6 rests against an anti-stick pad 20 that is attached to the inner front face of the pole piece 10. Into the adjacent end portion of the armature 6, a valve lifter 22 is inserted which is in operative connection with a valve body of a valve to which the actuating magnet 1 is attached via a fastening flange 24.

A coil housing 26 comprising a coil carrier 28, a magnet coil 30 supported by it, and a coil casing 32 encompassing these components is slid onto the pole tube 4. The coil casing 32 is biased via a coil fastening nut 34 against a support ring 36 that is connected with the pole piece 10. The coil fastening nut 34 comprises an internal thread 38 that is in engagement with an external thread 40 at a radially projecting thread flange 42 of the stroke limitation 8. The current feed of the magnet coil 30 is performed via connections 44 formed at the coil housing 26. By powering off the magnet coil 30, the armature 6 may be moved from its illustrated switching position to the left by the force of the spring 18, so that the valve lifter 22 performs a corresponding stroke that is transmitted to the valve body of the assigned valve. Into the end portion of the armature 6 which is remote from the valve lifter 22, a measuring bar 46 is inserted which penetrates the spring 18 in axial direction as well as a through bore 48 of the stroke limitation 8 and immerses into the position sensor 1. A pressure pipe 52 with a support flange 54 is supported at a radial shoulder 50 of the through bore 38 and is sealed by means of a seal 56 in this region. The measuring bar 46 immerses into a blind bore 58 of the pressure pipe 52, wherein the axial length thereof is chosen such that the armature 6 and hence also the measuring bar 46 are adapted to perform the predetermined switching stroke.

By means of FIG. 2, further details of the position sensor unit are explained. Accordingly, a sensor housing 60 of the position sensor unit 2 is mounted on the pressure pipe 52. The sensor housing 60 comprises an external housing 62 to which plug connections 64 for the contacting of signal and current supply connections are injected integrally. The external housing 62 encompasses a sensor coil housing 66 into which a sensor coil 68 is injected by injection molding. In accordance with the invention it is provided to sheathe the unit of sensor coil housing 66 and sensor coil 68 by injection molding with the external housing 62, so that the entire sensor housing 60 constitutes a structural unit. As a matter of principle, the individual components (external housing 62, connections 64, sensor coil housing 66, and sensor coil 68) may also be designed as separate components that are assembled in the known manner. The afore-described structural unit produced by injection molding has, however, the advantage that the pre-assembled sensor housing 60 can be produced with little effort and high precision.

In accordance with FIG. 2, the sensor coil housing 66 comprises at the right end portion thereof a support hub 70 projecting along the pressure pipe 52 and being penetrated by the end portion of the pressure pipe 52, so that it projects from the support hub 70. At that end portion of the pressure pipe 52, an external thread 72 is formed onto which an adjusting nut 74 is screwed which rests with the front side thereof against the support hub 70. By adjusting this adjusting nut 74, it is thus possible to adjust the relative position of the sensor housing 60 with the sensor coil 68 in relation to the pressure pipe 52 and hence also to the measuring bar 46.

The sensor housing 60 is biased via an adjusting spring 76 in the direction of the adjusting nut 74, wherein the adjusting spring 76 is supported at a front face 77 of a radial expansion of the through bore 48. This means that the adjustment of the adjusting screw 74 to the left in FIG. 2 is performed against the force of the adjusting spring 76, so that the sensor housing 60 is pre-positioned by the adjusting nut 74, on the one hand, and the adjusting spring 76, on the other hand, as a function of the position of the adjusting nut 74. The external housing 62 is, with its left end portion in FIG. 2, designed with an annular locking collar 78 that encompasses the adjacent hub-shaped end portion of the stroke limitation 8 (at the right of the thread flange 42), so that this region of the sensor housing 60 is guided to slide on the stroke limitation 8.

For anti-twist protection between the pole tube 4 and the sensor housing 60, the locking collar 78 is provided with an internal toothing 80, and the outer circumference of the stroke limitation 8 which cooperates therewith is provided with a corresponding external toothing 82, so that the coil housing 60 is guided along the toothing engagement both in axial direction and in radial direction as well as in circumferential direction (twisting).

At the actuating magnet-side end portion of the external housing 62, a fastening flange 84 encompassing the locking collar 78 is further formed, said fastening flange 84 being guided with an inner circumference face 86 on a circumference step 88 of the coil fastening nut 34. Thus, the left end portion of the sensor housing 60 is, on the one hand, guided along the toothing 80, 82 and, on the other hand, along the coil fastening nut 34. At the outer circumference of the fastening flange 84, an external thread 89 is formed which combs with an internal thread 90 of a sleeve-like counter nut 92. It encompasses with the—in FIG. 2—right end portion the fastening flange 84, so that the counter nut 92 is guided thereon, and rests with its—in FIG. 2—left front face 94 against an adjacent abutment face 96 of the coil housing 26 or, more exactly, of the coil casing 32. The counter nut is guided with a guiding portion 91 on the outer circumference of the coil fastening nut. At the outer circumference of the counter nut 92, longitudinal grooves are formed to improve the handling thereof.

In the contact area between the coil casing 32, the coil fastening nut 34, and the pole tube piece 14 as well as the coil fastening nut 34, the counter nut 92, and the coil casing 32, respective seals 98, 100 are positioned. Corresponding seals are also positioned—as usual—in the area between the pole tube piece 14 and the stroke limitation 8 as well as in the contact area between the connecting flange 84 and the coil fastening nut 34. For attaching or adjusting the coil housing 60 with respect to the position of the measuring bar 46, the counter nut 92 is screwed to the right, so that it gets in a distance to the coil casing 32. Subsequently, the entire coil housing 60 is displaced via the adjusting nut 74 against the force of the adjusting spring 76, wherein it is guided along the outer circumferential face of the pressure pipe 52, the toothing 80, 82, as well as the sliding guide between the fastening flange 84 and the coil fastening nut 34. After the adjustment of the predetermined adjusting position, the counter nut 92 is pulled tight again until it gets into contact with the coil casing 32 and thus fastens and counters the coil housing 60, so that the adjusted position is reliably fixed.

In the illustrated embodiment, the housing portions, preferably the external housing 62, the housing-side regions of the plug connections, and the sensor coil housing 66 are manufactured of plastics.

In the illustrated embodiment, the counter nut 92 is supported at the coil casing 32 at the front side. In another embodiment, the counter nut 92 may also engage in the circumference step 88 with the left end portion thereof which is shortened vis-à-vis the afore-described solution, and then be supported at the support shoulder designated with reference sign 102 in FIG. 2.

Disclosed are a position sensor unit and a valve arrangement comprising such a position sensor unit, wherein a sensor housing of the position sensor unit is fixed in position with respect to a housing of an actuating magnet or a valve by an adjusting nut and a counter nut. The counter nut is mounted on the sensor housing and supported at the housing.

LIST OF REFERENCE SIGNS 1 actuating magnet
2 position sensor unit
4 pole pipe
6 armature
8 stroke limitation
10 pole piece
12 intermediate ring
14 pole ring
16 armature chamber
18 spring
20 anti-stick pad
22 valve lifter
24 fastening flange
26 coil housing
28 coil carrier
30 magnet coil
32 coil casing
34 coil fastening nut
36 support ring
38 internal thread
40 external thread
42 thread flange
44 connections
46 measuring bar
48 through bore
50 radial shoulder
52 pressure tube
54 support flange
56 seal
58 blind bore
60 sensor housing
62 external housing
64 plug connections
66 sensor coil housing
68 sensor coil
70 support hub
72 external thread
74 adjusting nut
76 adjusting spring
77 front face
78 locking collar
80 toothing
82 toothing
84 fastening flange
86 inner circumference face
88 circumference step
89 external thread
90 internal thread
91 guide section
92 counter nut
94 front face
96 contact face
98 seals
100 seals
102 support shoulder

The invention claimed is:

1. A position sensor unit for attaching to a housing, comprising:
a sensor coil; and
a measuring bar that is movable relative to the housing,
wherein said sensor coil and said measuring bar are accommodated in a sensor housing that is adapted to be displaced in a direction of a sensor axis by means of an adjusting nut for adjusting the relative position,
wherein a counter nut is supported in an axial direction indirectly or directly at the housing, said counter nut encompasses the sensor housing in sections, and said counter nut is in thread engagement with said sensor housing to fix the adjusted relative position, and
wherein a fastening flange of said sensor housing is guided radially inside on a coil fastening nut of said housing.

2. The position sensor unit according to claim 1, wherein said housing and said sensor housing are connected with each other indirectly or directly by means of an anti-twist protection.

3. The position sensor unit according to claim 2, wherein a locking collar comprising a toothing is formed at said sensor housing, said locking collar being in engagement with a corresponding toothing at the outer circumference of a house-side hub projection.

4. The position sensor unit according to claim 3, wherein said counter nut comprises an internal thread that is in engagement with an external thread of a fastening flange encompassing said locking collar.

5. The position sensor unit according to claim 1, wherein said sensor housing is biased via said adjusting nut against an adjusting spring supported at said housing.

6. The position sensor unit according to claim 1, wherein said sensor coil and/or the connections thereof are molded into said sensor housing.

7. The position sensor unit according to claim 1, wherein said housing is assigned to an actuating magnet, and wherein said measuring bar is in operative connection with an armature of said actuating magnet.

8. The position sensor unit according to claim 3, wherein said measuring bar is in operative connection with an armature of an actuating magnet, wherein said house-side hub projection is formed at a stroke limitation of a pole pipe of said actuating magnet.

9. The position sensor unit according to claim 1, wherein said sensor coil and/or the connections thereof are molded into said sensor housing, wherein said counter nut is supported at said coil fastening nut of an actuating magnet.

10. The position sensor unit according to claim 1, wherein said sensor housing is guided in axial direction on a house-side anchored pressure tube onto which said adjusting nut is screwed.

11. A valve arrangement comprising a position sensor unit according to claim 1.

12. The position sensor unit according to claim 1, wherein the housing is a valve housing or an actuating magnet housing.

13. The position sensor unit according to claim 3, wherein the toothing is an internal toothing.

14. The position sensor unit according to claim 12, wherein said housing is a valve housing.

* * * * *